United States Patent
Dai et al.

(10) Patent No.: US 9,386,296 B2
(45) Date of Patent: Jul. 5, 2016

(54) METHOD AND APPARATUS FOR CODED FOCAL STACK PHOTOGRAPHING

(71) Applicant: Tsinghua University, Beijing (CN)

(72) Inventors: Qionghai Dai, Beijing (CN); Xing Lin, Beijing (CN); Jinli Suo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 337 days.

(21) Appl. No.: 14/194,931

(22) Filed: Mar. 3, 2014

(65) Prior Publication Data

US 2014/0313288 A1  Oct. 23, 2014

(30) Foreign Application Priority Data

Apr. 18, 2013 (CN) .......................... 2013 1 0136416

(51) Int. Cl.
*H04N 13/00* (2006.01)
*H04N 13/02* (2006.01)
*H04N 5/335* (2011.01)

(52) U.S. Cl.
CPC ........... *H04N 13/0207* (2013.01); *H04N 5/335* (2013.01); *H04N 13/0271* (2013.01)

(58) Field of Classification Search
None
See application file for complete search history.

(56) References Cited

U.S. PATENT DOCUMENTS

| | | | | |
|---|---|---|---|---|
| 2011/0261164 A1* | 10/2011 | Olesen | ............... | G01N 15/1475 348/46 |
| 2012/0218386 A1* | 8/2012 | Brady | ............... | H04N 13/026 348/46 |
| 2013/0016885 A1* | 1/2013 | Tsujimoto | ............... | G06T 5/003 382/128 |
| 2013/0113896 A1* | 5/2013 | Prantl | ............... | G01B 11/2513 348/49 |
| 2014/0022347 A1* | 1/2014 | Liu | ............... | G02B 21/367 348/46 |

OTHER PUBLICATIONS

Jacobs, D., Back, J., and Levoy, M., "Focal stack compositing for depth of field control," Stanford Computer Graphics Laboratory Technical Report 2012-I (2012).*
Kutulakos K. N., Hasinoff S. W., "Focal stack photography: High-performance photography with a conventional camera", In Proceedings of the IAPR Conference on Machine Vision Applications (2009).*

* cited by examiner

*Primary Examiner* — Frederick Bailey
(74) *Attorney, Agent, or Firm* — Hodgson Russ LLP

(57) ABSTRACT

A method and an apparatus for coded focal stack photographing are provided. The method includes: changing a focal surface within a single exposure time and per-pixel coding a sensor readout for each focal surface to obtain a modulation function $M(y,z)$, where $y \subset \{y_1,y_2\}$ is a two-dimensional spatial coordinate and z is a depth coordinate of a latent three-dimensional focal stack $F(y,z)$; coding the latent three-dimensional focal stack $F(y,z)$ into a two-dimensional sensor image $I(y)$ by using the modulation function $M(y,z)$; and achieving one or more of a programmable non-planar focal surface imaging, an interleaved focal stack imaging, and a compressive focal stack imaging, based on the modulation functions $M(y,z)$ and the two-dimensional sensor image $I(y)$.

15 Claims, 5 Drawing Sheets

METHOD AND APPARATUS FOR CODED FOCAL STACK PHOTOGRAPHING

FIELD

The present disclosure relates to a computational photography field, and more particularly relates to a method and an apparatus for coded focal stack photographing.

BACKGROUND

A conventional camera requires a user to carefully choose camera parameters before taking an image. Moreover, in almost every commercial camera a focal surface is approximately planar over a sensor's area. Nowadays, however, some of most important applications of commercial computational cameras are post-capture refocusing, flexible control and extension of depth of field, and synthetic aperture imaging. For any computational camera design supporting these applications, high-dimensional visual information, such as an all-in-focus (AIF) image, a depth or a light field, has to be optically encoded in a recorded sensor image and computationally decoded.

Currently available commercial computational cameras mainly include a time-of-flight (ToF) camera and a light field camera. Specifically, for the ToF camera, a three-dimensional image is obtained by continuously transmitting light pulses to a scene, receiving a light returning from an object via a sensor and measuring a flight time of the light pulses; and for the light field camera, a three-dimensional focal stack is reconstructed by acquiring a four-dimensional optical filed. Unfortunately, the ToF camera requires extensive modification of a sensor circuitry and an on-board processing, while the light field camera achieves only low resolution images.

SUMMARY

Embodiments of the present disclosure seek to solve at least one of the problems existing in the related art to at least some extent.

According to one aspect of the present disclosure, a method for coded focal stack photographing is provided. The method comprises: changing a focal surface within a single exposure time within a single exposure time and per-pixel coding a sensor readout for each focal surface to obtain a modulation function $M(y,z)$, where $y \subset \{y_1, y_2\}$ is a two-dimensional spatial coordinate and z is a depth coordinate of a latent three-dimensional focal stack $F(y,z)$; coding the latent three-dimensional focal stack $F(y,z)$ into a two-dimensional sensor image $I(y)$ by using the modulation function $M(y,z)$; and achieving one or more of a programmable non-planar focal surface imaging, an interleaved focal stack imaging, and a compressive focal stack imaging, based on the modulation functions $M(y,z)$ and the two-dimensional sensor image $I(y)$, wherein in the programmable non-planar focal surface imaging, an equivalent programmable non-planar sensor surface is obtained by the modulation function $M(y,z)$ corresponding to a shape of the focal surface; in the interleaved focal stack imaging, the latent three-dimensional focal stack $F(y,z)$ is multiplexed into the two-dimensional sensor image $I(y)$, and a demultiplexing and a bicubic interpolation are performed for the latent three-dimensional focal stack $F(y,z)$ to obtain a recovered full-resolution three-dimensional focal stack; and in the compressive focal stack imaging, a recovered full-resolution AIF image and a depth map are obtained from the two-dimensional sensor image $I(y)$ by using a sparsity coding and a compressive sensing reconstruction algorithm in conjunction with a relative blur constraint and a transform domain spatial sparsity constraint.

In one embodiment, achieving the programmable non-planar focal surface imaging based on the modulation function $M(y,z)$ and the two-dimensional sensor image $I(y)$ comprises: defining the focal surface as $\phi(y)=z$, then the modulation function $M(y,z)$ being expressed as $M(y,z)=\delta(z-\phi(y))$.

In one embodiment, if the focal surface is parabola-shaped, the modulation function $M(y,z)$ is expressed as $\phi(y)=y_2^2$.

In one embodiment, if the focal surface is step-shaped, the modulation function $M(y,z)$ is expressed as $\phi(y)=aH(y_2)$, where a is a constant coefficient and $H(\cdot)$ is a step function.

In one embodiment, achieving the interleaved focal stack imaging based on the modulation function $M(y,z)$ and the two-dimensional sensor image $I(y)$ comprises: with the interleaved focal stack imaging, demodulating the two-dimensional sensor image $I(y)$ to obtain a low resolution three-dimensional focal stack $F(y_z, z)=I(y_z) \cdot M(y_z, z)$, where $y_z \subset y$, $M(y_z, z)$ is the modulation function implementing interleave-shaped focal surface; defining $M(y_z, z)$ as $M(y,z)=\delta(z-h(y))$, where $h(y)=\Sigma_m g(y) \otimes \delta(y-m \cdot T)$, $m \in Z$ is a periodic function with a cycle T, a domain of $g(y)$ is $[0, T]$, $\otimes$ is a convolution operator; assuming a discretized latent band-limited focal stack with n layers, then defining $g(y)=\Sigma_{i=1}^n a_i \cdot \text{rect}(y-i)$, where rect is a rectangle function, $z=1, \ldots, n$, $T=n$, $\{a_1, \ldots, a_i \ldots a_j \ldots, a_n\}=\{1, \ldots, n\}$, $a_i \neq a_j$, $n \in \Delta y$, and $\Delta y$ is a neighbourhood of y representing a local sensor region containing all the n layers intended to be recovered.

In one embodiment, achieving the compressive focal stack imaging based on the modulation functions $M(y,z)$ and the two-dimensional sensor image $I(y)$ comprises: using a random modulation function as a sensing matrix to obtain a single coded focal stack; and obtaining the recovered full-resolution three-dimensional focal stack by using an intrinsic sparsity thereof.

In one embodiment, in the compressive focal stack imaging, obtaining a recovered full-resolution AIF image and a depth map from the two-dimensional sensor image $I(y)$ by using a sparsity coding mechanism and a compressive sensing reconstruction algorithm in conjunction with a relative blur constraint and a transform domain spatial sparsity constraint comprises: compressing and reconstructing an initial three-dimensional focal stack; performing a depth from defocus estimation according to the initial three-dimensional focal stack to obtain the depth map; obtaining the relative blur constraint of the initial three-dimensional focal stack by the depth and feeding back the relative blur constraint of the initial three-dimensional focal stack into a recovered three-dimensional focal stack for compressing and reconstructing the recovered three-dimensional focal stack; performing an iterative optimization between the depth from defocus estimation and the recovered three-dimensional focal stack reconstruction until convergence to obtain an optimized recovered three-dimensional focal stack and an optimized depth map; and generating the recovered full-resolution AIF image and the depth map by using the optimized recovered three-dimensional focal stack and the optimized depth map An Alternating Direction Method (ADM) numerical solution is used to solve both a depth estimation and a focal stack recovery. For the depth estimation, good initial defocused images have been provided and numerical solution is robust to noise. For the defocused images recovery, depth errors usually occur in the textless area and the transform domain spatial sparsity constraint helps correction. Therefore, an iterative Re-weighted Least Squares (IRLS) process is extended to deal with spatially varying convolution and incorporate information from multiple input images.

According to another aspect of the present disclosure, an apparatus for coded focal stack photographing is provided. The apparatus comprises: an image acquisition module, configured to change a focal surface within a single exposure time and per-pixel code a sensor readout for each focal surface to obtain a modulation function M(y,z), where $y \subset \{y_1, y_2\}$ is a two-dimensional spatial coordinate and z is a depth coordinate of a latent three-dimensional focal stack F(y,z), and to code the latent three-dimensional focal stack F(y,z) into a two-dimensional sensor image I(y) by using the modulation function M(y,z); a programmable non-planar focal surface imaging module, configured to obtain an equivalent programmable non-planar sensor surface by the modulation functions M(y,z) corresponding to a shape of the focal surface; an interleaved focal stack imaging module, configured to multiplex the latent three-dimensional focal stack F(y,z) to the two-dimensional sensor image I(y), and to perform a demultiplexing and a bicubic interpolation for the latent three-dimensional focal stack F(y,z) to obtain a recovered full-resolution three-dimensional focal stack; and a compressive focal stack imaging module, configured to obtain a recovered full-resolution AIF image and a depth map from the two-dimensional sensor image I(y) by using a sparsity coding and a compressive sensing reconstruction algorithm in conjunction with a relative blur constraint and a transform domain spatial sparsity constraint.

In one embodiment, the image acquisition module comprises: a long-focus lens camera configured to photograph an object; a programmable moving lens, disposed between the object and the long-focus lens camera and configured to change the focal surface; an LCD panel, disposed between the programmable moving lens and the long-focus lens camera and configured to realize a per-pixel coding exposure; a first relay lens, disposed between the programmable moving lens and the LCD panel and configured to relay a light path; and a second relay lens, disposed between the LCD panel and the long-focus lens camera and configured to relay the light path.

In one embodiment, the programmable non-planar focal surface imaging module is configured to define the focal surface as $\phi(y)=z$, then express the modulation function M(y, z) as $M(y,z)=\delta(z-\phi(y))$.

In one embodiment, if the focal surface is parabola-shaped, the modulation function M(y,z) is expressed as $\phi(y)=y_2^2$.

In one embodiment, if the focal surface is step-shaped, the modulation function M(y,z) is expressed as $\phi(y)=aH(y_2)$, where a is a constant coefficient and $H(\cdot)$ is a step function.

In one embodiment, the interleaved focal stack imaging module is configured, with the interleaved focal stack imaging, to demodulate the two-dimensional sensor image I(y) to obtain a low resolution three-dimensional focal stack $F(y_z, z)=I(y_z)\cdot M(y_z, z)$, where $y_z \subset y$, $M(y_z, z)$ is the modulation function implementing interleave-shaped focal surface; to define $M(y_z, z)$ as $M(y,z)=\delta(z-h(y))$, where $h(y)=\Sigma_m g(y)\otimes \delta(y-m\cdot T)$, $m \in Z$ is a periodic function with a cycle T, a domain of g(y) is [0, T], $\otimes$ is a convolution operator; assuming a discretized latent band-limited focal stack with n layers, to define $g(y)=\Sigma_{i=1}^n a_i \cdot rect(y-i)$, where rect is a rectangle function, $z=1, \ldots, n$, $T=n$, $\{a_1, \ldots a_i \ldots a_j \ldots, a_n\}=\{1, \ldots, n\}$, $a_i \neq a_j$, $n \in \Delta y$, and $\Delta y$ is a neighbourhood of y representing a local sensor region containing all the n layers intended to be recovered.

In one embodiment, the compressive focal stack imaging module is configured: to use a random modulation function as a sensing matrix to obtain a single coded focal stack; and to obtain the recovered full-resolution three-dimensional focal stack by using an intrinsic sparsity thereof.

In one embodiment, the compressive focal stack imaging module comprises: a compression unit, configured to compress and reconstruct an initial three-dimensional focal stack; a depth from defocus estimation unit, configured to perform a depth from defocus estimation according to the initial three-dimensional focal stack to obtain the depth map; a blur constraint unit, configured to obtain the relative blur constraint of the initial three-dimensional focal stack by the depth and to feed back the relative blur constraint of the initial three-dimensional focal stack into a recovered three-dimensional focal stack for compressing and reconstructing the recovered three-dimensional focal stack; an iterative optimization unit, configured to perform an iterative optimization between the depth from defocus estimation and the recovered three-dimensional focal stack reconstruction until convergence to obtain an optimized recovered three-dimensional focal stack and an optimized depth map; and an AIF image generating unit, configured to generate the recovered full-resolution AIF image and the depth map by using the optimized recovered three-dimensional focal stack and the optimized depth map.

An Alternating Direction Method (ADM) numerical solution is used to solve both a depth estimation and a focal stack recovery. For the depth estimation, good initial defocused images have been provided and numerical solution is robust to noise. For the defocused images recovery, depth errors usually occur in the textless area and the transform domain spatial sparsity constraint helps correction. Therefore, an iterative Re-weighted Least Squares (IRLS) process is extended to deal with spatially varying convolution and incorporate information from multiple input images.

With the method and the apparatus for coded focal stack photographing, a coded focal stack photography as a computational photography paradigm that combines a focal sweep and the per-pixel coded sensor readout with novel computational algorithms is presented. Such flexible capture modes are tailored to various applications including a photography with programmable non-planar focal surfaces and multiplexed focal stack acquisition and allow for a capture of higher-resolution images or reducing requirements on computational resources. Moreover, by exploring sparse coding techniques, coded focal stacks can also be used to recover the full-resolution AIF image and the depth map from a single photograph.

Additional aspects and advantages of the present disclosure are given in the following description, part of which becomes apparent from the following description or appreciated from the practice according to the present disclosure.

BRIEF DESCRIPTION OF THE DRAWINGS

These and other aspects and advantages of embodiments of the present disclosure will become apparent and more readily appreciated from the following descriptions made in conjunction with the accompanying drawings, in which.

DETAILED DESCRIPTION

Figure 1:
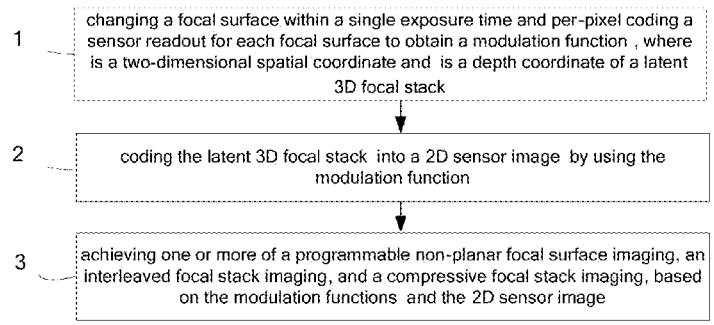
FIG. 1 is a flow chart of a method for coded focal stack photographing according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation.

In addition, terms such as "first" and "second" are used herein for purposes of description and are not intended to indicate or imply relative importance or significance.

A method for coded focal stack photographing is provided according to one aspect of the present disclosure. As shown in FIG. 1, the method comprises following steps.

In step 1, a focal surface is changed within a single exposure time and a sensor readout is per-pixel coded for each focal surface to obtain a modulation function $M(y,z)$.

Figure 2:
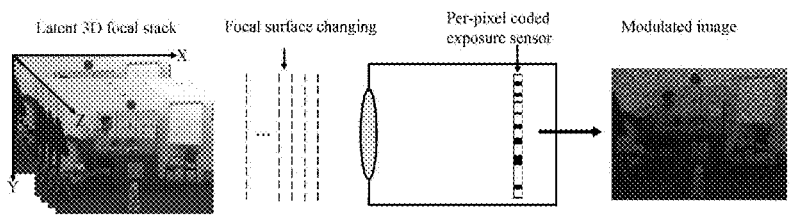
FIG. 2 is a schematic diagram of a capture of a single exposure coded focal stack according to an embodiment of the present disclosure.

FIG. 2 is a schematic diagram of a capture of a single exposure coded focal stack according to an embodiment of the present disclosure. Specifically, the focal surface may be changed by means of programmable changing of a position of a lens or a sensor. A per-pixel exposure is realized by coding the sensor readout. In one embodiment, let $F(y,z)$ denote a latent three-dimensional (3D) focal stack, where $y \subset \{y_1, y_2\}$ is a two-dimensional (2D) spatial coordinate and z is a depth coordinate of the latent 3D focal stack $F(y,z)$.

In step 2, the latent 3D focal stack $F(y,z)$ is coded into a 2D sensor image $I(y)$ by using the modulation function $M(y,z)$. The 2D sensor image $I(y)$ is then a coded projection of the focal stack:

$$I(y) = \int_{\Omega_z} F(y,z) M(y,z) dz \qquad (1)$$

where $\Omega_z$ is a range of z.

In step 3, one or more of a programmable non-planar focal surface imaging, an interleaved focal stack imaging, and a compressive focal stack imaging is realized, based on the modulation functions $M(y,z)$ and the 2D sensor image $I(y)$.

(3.1) In the programmable non-planar focal surface imaging, an equivalent programmable non-planar sensor surface is obtained by the modulation function $M(y,z)$ corresponding to a shape of a focal surface. That is, achieving the programmable non-planar focal surface imaging is an intuitive solution for flexible control of the focal surface, and actually a spatio-depth modulation may provide an equivalent implementation, in which a virtual shape of the focal surface is determined by the modulation function $M(y,z)$. Eq. (1) gives that an intensity at a position y in the 2D sensor image $I(y)$ is determined by pixels of the focal stack at a same position with the modulation function $M(y,z)$ being 1. In this embodiment, the focal surface is defined as $\phi(y)=z$, then the modulation function $M(y,z)$ may be expressed as:

$$M(y, z) = \delta(z - \phi(y)). \qquad (2)$$

Figure 3:
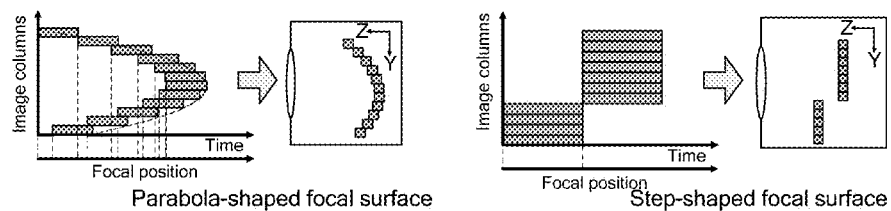
FIG. 3 is a schematic diagram of a programmable non-planar focal surface imaging according to an embodiment of the present disclosure.

Differently shaped non-planar focal surfaces can be obtained by designing different modulation functions according to Eq. 2. FIG. 3 shows two examples of the non-planar focal surface results. If the focal surface is parabola-shaped, the modulation function $M(y,z)$ is expressed as $\phi(y)=y_2^2$ as shown in FIG. 3(*a*). If the focal surface is step-shaped, the modulation function $M(y,z)$ is expressed as $\phi(y)=aH(y_2)$, where a is a constant coefficient and $H(\cdot)$ is a step function.

(3.2) In the interleaved focal stack imaging, the latent 3D focal stack $F(y,z)$ is multiplexed into the 2D sensor image $I(y)$, and a demultiplexing and a bicubic interpolation are performed for the latent 3D focal stack $F(y,z)$ to obtain a recovered full-resolution 3D focal stack.

Specifically, with the interleaved focal stack imaging, a low resolution 3D focal stack $F(y_z, z)$, $y_z \subset y$ can be obtained by demodulating the 2D sensor image $I(y)$, that is $F(y_z, z) = I(y_z) \cdot M(y_z, z)$, where $M(y_z, z)$ is the modulation function implementing interleave-shaped focal surface. $M(y_z, z)$ is defined as:

$$M(y, z) = \delta(z - h(y)), \qquad (3)$$

where $h(y) = \Sigma_m g(y) \otimes \delta(y - m \cdot T)$, $m \in Z$ is a periodic function with a cycle T, a domain of $g(y)$ is $[0, T]$, $\otimes$ is a convolution operator.

Assuming a discretized latent band-limited focal stack with n layers, then $g(y)$ can be defined as:

$$g(y) = \Sigma_{i=1}^n a_i \cdot \text{rect}(y - i), \qquad (4)$$

where rect is a rectangle function, $z = 1, \ldots, n$, $T = n$ and $$\{a_1, \ldots a_i \ldots a_j \ldots, a_n\} = \{1, \ldots, n\}, a_i \neq a_j, n \in \Delta y, \qquad (5)$$

and $\Delta y$ is a neighbourhood of y representing a local sensor region containing all the n layers intended to be recovered.

Figure 4:
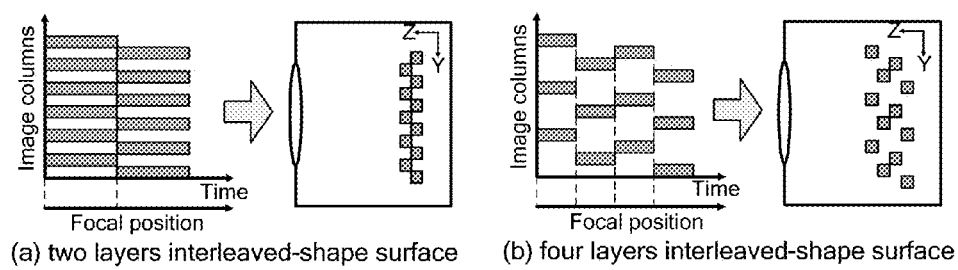
FIG. 4 is a schematic diagram of an interleaved focal stack surface imaging according to an embodiment of the present disclosure.
Figure 5:
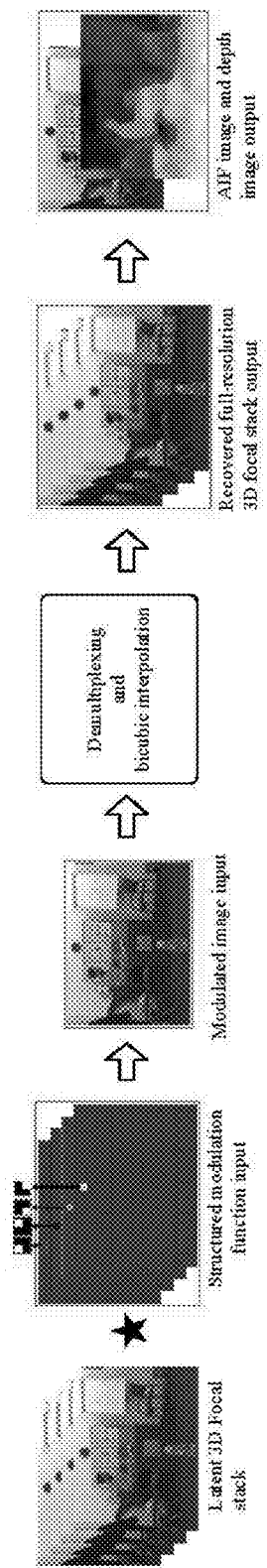
FIG. 5 is a process flow of a demodulating method.

FIG. 4(*a*) and FIG. 4(*b*) illustrate interleaved focal stack imaging at n=2 and n=4 respectively, and a process flow of a demodulating method is illustrated in FIG. 5. In order to compensate for the reduced spatial resolution, a bicubic interpolation is adopted for each defocused image to upsample to the full-resolution in a reconstruction.

Figure 6:
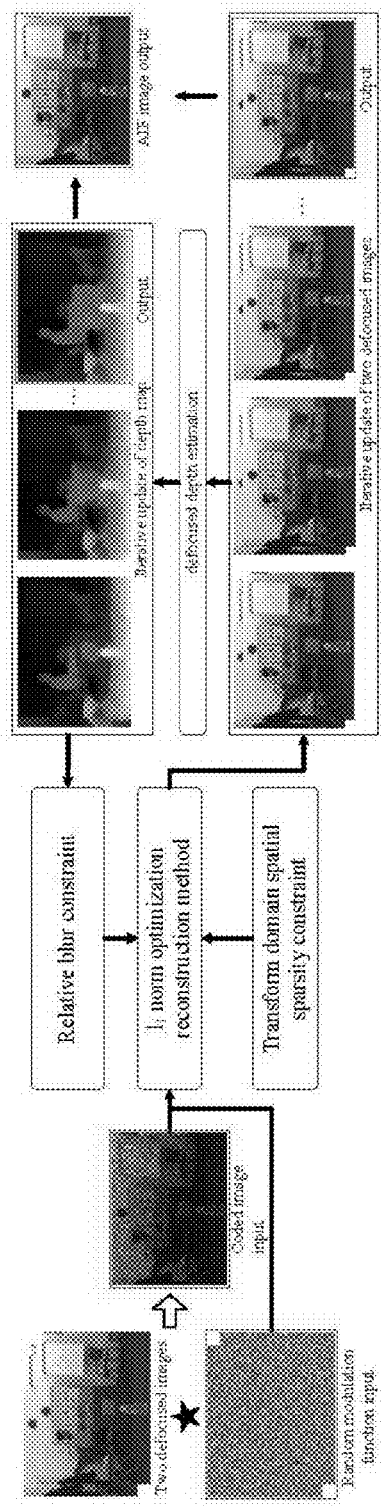
FIG. 6 is a schematic diagram of a compressive sampling of a focal stack according to an embodiment of the present disclosure.

(3.3) In the compressive focal stack imaging, a recovered full-resolution AIF image and a depth map are obtained by using a sparsity coding and a compressive sensing reconstruction algorithm in conjunction with a relative blur constraint and a transform domain spatial sparsity constraint. FIG. 6 shows a sparsity essence of the focal stack. In one embodiment, a random modulation function $$M(y,z) = \text{rand}(y,z) \qquad (6)$$

is used for encoding the latent 3D focal stack $F(y,z)$. Specifically, a binary random modulation function $\text{rand}(y,z) \in \{0,1\}$ may be used. Then an estimated focal stack $\tilde{F}(y,z)$ may be recovered by optimizing following objective function:

$$\tilde{F}(y, z) = \arg\min_{F(y,z)} (E_d(F(y, z)) + \alpha E_m^s(F(y, z))), \quad (7)$$

and here the data term $E_d(F(y,z))$ is derived from Eq. (1):

$$E_d(F(y, z)) = \|\int_{\Omega_z} M(y, z) F(y, z) dz - I(y)\|_2^2, \quad (8)$$

where $\alpha$ is a weighting factor, $\Omega_z$ is the range of z. For a regularization term, the transform domain spatial sparsity of the latent 3D focal stack $F(y,z)$ is enforced by minimizing an $l_1$ norm of coefficients:

$$E_m^s(F(y, z)) = \|\Psi F(y, z)\|_1, \quad (9)$$

where $\Psi$ is a sparsity transform basis. A discrete cosine basis (DCT) is used in this embodiment. In another embodiment, other bases, such as a wavelet may be used alternatively.

In one embodiment, obtaining the recovered full-resolution AIF image and the depth map by using the sparsity coding and the compressive sensing reconstruction algorithm in conjunction with the relative blur constraint and the transform domain spatial sparsity constraint may comprises following steps.

In step 3.3.1, an initial 3D focal stack is compressed and reconstructed. Specifically, let R(y) denote the AIF image, a defocused image F(y) focusing on a certain depth may be represented as:

$$F(Y) = \int_{x \in N(y)} h_\sigma(y, x) R(x) dx. \quad (10)$$

Here N(y) is the neighborhood of y and the blur kernel $h_\sigma(y, x)$ may be approximated by a Gaussian convolution model, and $\sigma(y) = \kappa b(y)$ is an amount of depth-related blurring, with the calibration parameter $\kappa$ and the blur radius $b(y) = Dv/2 \cdot |1/F - 1/v - 1/s(y)|$, where D denotes an aperture diameter, s denotes a depth map, v denotes a focus setting and F denotes a focal length.

Given two registered defocused images $F(y, z_1)$ and $F(y, z_2)$, where $z_i$ denotes a distance from the object to the lens, with focal setting $vz_1, vz_2$ and keeping the other camera parameters consistent, the relative blur based convolution model is defined as:

$$\begin{cases} F(y, z_2) \approx F_{\Delta\sigma}(y, z_1) \\ \quad = \int_{\Omega_x} h_{\Delta\sigma}(y, x) F(x, z_1) dx, \sigma_{z_2}^2(y) > \sigma_{z_1}^2(y), \\ F(y, z_1) \approx F_{\Delta\sigma}(y, z_2) n \\ \quad = \int_{\Omega_x} h_{\Delta\sigma}(y, x) F(x, z_2) dx, \sigma_{z_2}^2(y) < \sigma_{z_1}^2(y), \end{cases} \quad (11)$$

where $\Delta\sigma(y) = \sqrt{\sigma_{z_2}^2(y) - \sigma_{z_1}^2(y)}$ is a depth-related relative blurring.

Thus, a relative blur operator $\Phi$ between the two defocused images $F(y, z_1)$ and $F(y, z_2)$ may be derived by using Eqs. (11) when the depth and camera parameters are provided, and the relative blur constraint for an optimization in Eq. 7 may be formulated as:

$$E_m^d(F(y)) = \|\Phi_z F(y, z)\|_2^2. \quad (12)$$

In step 3.3.2, a depth from defocus estimation is performed according to the initial 3D focal stack to obtain the depth map. Specifically, a depth may be estimated from the two defocused images $F(y, z_1)$ and $F(y, z_2)$ by optimizing a following equation:

$$\tilde{s} = \arg\min_s (E_d(s) + \gamma E_m(s)), \quad (13)$$

where $E_d(s)$ and $E_m(s)$ are a data term and a regularization term respectively, and $\gamma$ is a weighting factor. Specifically, the data term can be written as:

$$E_d(s) = \int_{\Omega_y} H(\Delta\sigma(y)) \cdot |F(y, z_2) - F_{\Delta\sigma}(y, z_1)|_2^2 dy - \int_{\Omega_y} (1 - H(\Delta\sigma(y))) \cdot |F(y, z_1) - F_{\Delta\sigma}(y, z_2)|_2^2 dy, \quad (14)$$

where H denotes a Heaviside function, and the regularization term $E_m(s)$ is defined as a total variation to favor a piecewise smooth scene depth: $E_m(s) = \|\nabla s(y)\|_1$.

In step 3.3.3, the relative blur constraint of the initial 3D focal stack is obtained by the depth and the relative blur constraint of the initial 3D focal stack is fed to a recovered 3D focal stack for compressing and reconstructing the recovered 3D focal stack.

Specifically, according to Eq. 10 and the initial depth from defocus estimation, two spatially varying blur kernel maps $h_{\sigma_{z1}}$ and $h_{\sigma_{z2}}$ to the two defocused images $F(y, z_1)$ and $F(y, z_2)$ respectively may be calculated. Then an optimization of the AIF image may be formulated as a spatially varying deblurring:

$$\tilde{R} = \arg\min_R (E_d(R) + \lambda E_m(R)), \quad (15)$$

where $\lambda$ is a weighting factor. The data term $E_d(R)$ is defined as:

$$E_d(R) = \|\int_{x \in N(y)} h_{\sigma_{z1}}(y, x) R(x) dx - F(y, z_1)\|_2^2 + \|\int_{x \in N(y)} h_{\sigma_{z2}}(y, x) R(x) dx - F(y, z_2)\|_2^2, \quad (16)$$

and for the regularization item $E_m(R)$, the sparse prior of a natural image is incorporated by: $E_m(R) = \|\nabla R(y)\|_{0.8}$.

In step 3.3.4, an iterative optimization is performed between the depth from defocus estimation and the recovered three-dimensional focal stack reconstruction until convergence to obtain an optimized recovered 3D focal stack and an optimized depth map.

In step 3.3.5, the recovered full-resolution AIF image and the depth map are generated by using the optimized recovered 3D focal stack and the optimized depth map. In one embodiment, the recovered full-resolution AIF image may be obtained by an optimization in Eq. 15.

For the interleaved focal stack imaging, the depth estimation may be directly performed by using Eq. 13 after obtaining the interpolated focal stack. For the compressive focal stack imaging, because of a difficulty in demultiplexing compressively modulated data, only the two defocused images $F(y, z_1)$ and $F(y, z_2)$ at different focal settings are encoded for a high PSNR (Power Signal-to-Noise Ratio) and also a feedback scheme is proposed to increase robustness.

Firstly, to recover the two defocused images $F(y, z_1)$ and $F(y, z_2)$, the demodulation algorithm in (3.3) utilizes only the spatial sparsity, so a performance is further improved by using relative blur constraint in step 3.3.1 (illustrated in FIG. 6). Then, the initial depth is obtained from Eq. 13 using the two defocused images $F(y, z_1)$ and $F(y, z_2)$ and then the depth constraint regularization is fed back into the optimization Eq. 7 to get a better demodulation:

$$\tilde{F}(y, z) = \underset{F(y,z)}{\arg\min} \, (E_d(F) + \alpha E_m^s(F) + \beta E_m^d(F)), \quad (17)$$

where $\alpha$ and $\beta$ are weighting factors, $z=\{z_1, z_2\}$, and three terms $E_d(F)$, $E_m^s(F)$ and $E_m^d$ are defined in Eqs. 8, 9 and 12 respectively.

In data capturing, there is a scaling between the defocused images when the focal surface of the camera is changed. In one embodiment, the scaling is approximated with an affine transformation: y2=ay1+b. A small aperture is kept and four markers are used in the scene to calibrate the parameters a and b. Thus, after the initial two defocused images are obtained by using the optimization Eq. 7, the affine transformation is applied to the initial two defocused images to calibrate them before the depth estimation. Correspondingly, an affine transformation operator T is added to Eq. 17 by changing the relative blur constraint $E_m^d(B(y))$ into:

$$E_m^d(F(y)) = \|\Phi_z T_z F(y, z)\|_2^2 \quad (18)$$

An ADM numerical solution is used to solve both a depth estimation and a focal stack recovery. For the depth estimation, good initial defocused images have been provided and numerical solution is robust to noise. For the defocused images recovery, depth errors usually occur in the textless area and the transform domain spatial sparsity constraint helps correction. Therefore, an iterative Re-weighted Least Squares (IRLS) process is extended to deal with spatially varying convolution and incorporate information from multiple input images.

Figure 7:
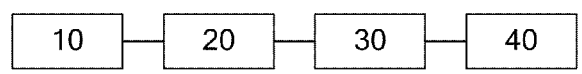
FIG. 7 is a block diagram of an apparatus for coded focal stack photographing according to an embodiment of the present disclosure.

An apparatus for coded focal stack photographing is further provided according to another aspect of the present disclosure. As shown in FIG. 7, the apparatus comprises: an image acquisition module 10, a programmable non-planar focal surface imaging module 20, an interleaved focal stack imaging module 30, and a compressive focal stack imaging module 40.

The image acquisition module 10 is configured to change a focal surface within a single exposure time and per-pixel code a sensor readout for each focal surface to obtain a modulation function M(y,z), where $y \subset \{y_1, y_2\}$ is a two-dimensional spatial coordinate and z is a depth coordinate of a latent three-dimensional focal stack F(y,z), and to code the latent three-dimensional focal stack F(y,z) into a two-dimensional sensor image I(y) by using the modulation function M(y,z).

The programmable non-planar focal surface imaging module 20 is configured to obtain an equivalent programmable non-planar sensor surface by the modulation functions M(y,z) corresponding to a shape of the focal surface.

The interleaved focal stack imaging module 30 is configured to multiplex the latent three-dimensional focal stack F(y,z) into the two-dimensional sensor image I(y), and to perform a demultiplexing and a bicubic interpolation for the latent three-dimensional focal stack F(y,z) to obtain a recovered full-resolution three-dimensional focal stack.

The compressive focal stack imaging module 40 is configured to obtain a recovered full-resolution all-in-focus image and a depth map by using a sparsity coding and a compressive sensing reconstruction algorithm in conjunction with a relative blur constraint and a transform domain spatial sparsity constraint.

Figure 8:
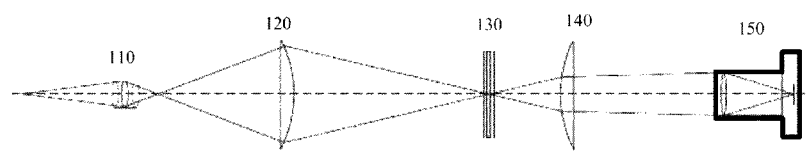
FIG. 8 is a schematic diagram of an image acquisition module according to an embodiment of the present disclosure.

In one embodiment, as shown in FIG. 8, the image acquisition module 10 comprises: a long-focus lens camera 150 configured to photograph an object; a programmable moving lens 110, disposed between the object and the long-focus lens camera 150 and configured to change the focal surface; an LCD panel 130, disposed between the programmable moving lens 110 and the long-focus lens camera 150 and configured to realize a per-pixel coding exposure; a first relay lens 120, disposed between the programmable moving lens 110 and the LCD panel 130 and configured to relay a light path; and a second relay lens 140, disposed between the LCD panel 130 and the long-focus lens camera 150 and configured to relay the light path.

In one embodiment, the programmable non-planar focal surface imaging module 20 is configured to define the focal surface as $\phi(y)=z$, then express the modulation function M(y, z) as $M(y,z)=\delta(z-\phi(y))$.

In one embodiment, if the focal surface is parabola-shaped, the modulation function M(y,z) is expressed as $\phi(y)=y_2^2$.

In one embodiment, if the focal surface is step-shaped, the modulation function M(y,z) is expressed as $\phi(y)=aH(y_2)$, where a is a constant coefficient and H(·) is a step function.

In one embodiment, the interleaved focal stack imaging module 30 is configured, with the interleaved focal stack imaging, to demodulate the two-dimensional sensor image I(y) to obtain a low resolution three-dimensional focal stack $F(y_z, z) = I(y_z) \cdot M(y_z, z)$, where $y_z \subset y$, $M(y_z, z)$ is the modulation function implementing interleave-shaped focal surface; to define M($y_z$, z) as $M(y,z)=\delta(z-h(y))$, where $h(y) = \Sigma_m g(y) \otimes \delta(y-m \cdot T)$, $m \in Z$ is a periodic function with a cycle T, a domain of g(y) is [0,T], $\otimes$ is a convolution operator; assuming a discretized latent band-limited focal stack with n layers, to define $g(y) = \Sigma_{i=1}^n a_i \cdot \text{rect}(y-i)$, where rect is a rectangle function, z=1, ..., n, T=n, $\{a_1, \ldots a_i \ldots a_j \ldots, a_n\} = \{1, \ldots, n\}$, $a_i \neq a_j$, $n \in \Delta y$, and $\Delta y$ is a neighbourhood of y representing a local sensor region containing all the n layers intended to be recovered.

In one embodiment, the compressive focal stack imaging module 40 is configured: to use a random modulation function as a sensing matrix to obtain a single coded focal stack; and to obtain the recovered full-resolution three-dimensional focal stack by using an intrinsic sparsity thereof.

In one embodiment, the compressive focal stack imaging module 40 comprises: a compression unit, configured to compress and reconstruct an initial three-dimensional focal stack; a depth from defocus estimation unit, configured to perform a depth from defocus estimation according to the initial three-dimensional focal stack to obtain the depth map; a blur constraint unit, configured to obtain the relative blur constraint of the initial three-dimensional focal stack by the depth and to feed back the relative blur constraint of the initial three-dimensional focal stack into a recovered three-dimensional focal stack for compressing and reconstructing the recovered three-dimensional focal stack; an iterative optimization unit, configured to perform an iterative optimization between the depth from defocus estimation and the recovered three-dimensional focal stack reconstruction until convergence to obtain an optimized recovered three-dimensional focal stack and an optimized depth map; and an AIF image generating unit, configured to generate the recovered full-resolution AIF image and the depth map by using the optimized recovered three-dimensional focal stack and the optimized depth map. An Alternating Direction Method (ADM) numerical solution is used to solve both a depth estimation and a focal stack recovery. For the depth estimation, good initial defocused images have been provided and numerical solution is robust to noise. For the defocused images recovery, depth errors usually occur in the textless area and the transform domain spatial sparsity constraint helps correction. Therefore, an iterative Re-weighted Least Squares (IRLS) process is extended to deal with spatially varying convolution and incorporate information from multiple input images.

With the method and the apparatus for coded focal stack photographing, a coded focal stack photography as a computational photography paradigm that combines a focal sweep and the per-pixel coded sensor readout with novel computational algorithms is presented. Such flexible capture modes are tailored to various applications including a photography with programmable non-planar focal surfaces and multiplexed focal stack acquisition and allow for a capture of higher-resolution images or reducing requirements on computational resources. Moreover, by exploring sparse coding techniques, coded focal stacks can also be used to recover the full-resolution AIF image and the depth map from a single photograph.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for coded focal stack photographing, comprising:
    changing a focal surface within a single exposure time and per-pixel coding a sensor readout for each focal surface to obtain a modulation function $M(y,z)$, where $y \subset \{y_1, y_2\}$ is a two-dimensional spatial coordinate and z is a depth coordinate of a latent three-dimensional focal stack $F(y,z)$;
    coding the latent three-dimensional focal stack $F(y,z)$ into a two-dimensional sensor image $I(y)$ by using the modulation function $M(y,z)$; and
    achieving one or more of a programmable non-planar focal surface imaging, an interleaved focal stack imaging, and a compressive focal stack imaging, based on the modulation functions $M(y,z)$ and the two-dimensional sensor image $I(y)$,
    wherein in the programmable non-planar focal surface imaging, an equivalent programmable non-planar sensor surface is obtained by the modulation function $M(y,z)$ corresponding to a shape of the focal surface;
    wherein in the interleaved focal stack imaging, the latent three-dimensional focal stack $F(y,z)$ is multiplexed into the two-dimensional sensor image $I(y)$, and a demultiplexing and a bicubic interpolation are performed for the latent three-dimensional focal stack $F(y,z)$ to obtain a recovered full-resolution three-dimensional focal stack; and
    wherein in the compressive focal stack imaging, a recovered full-resolution all-in-focus image and a depth map are obtained from the two-dimensional sensor image $I(y)$ by using a sparsity coding and a compressive sensing reconstruction algorithm in conjunction with a relative blur constraint and a transform domain spatial sparsity constraint.

2. The method according to claim 1, wherein achieving the programmable non-planar focal surface imaging based on the modulation function $M(y,z)$ and the two-dimensional sensor image $I(y)$ comprises:
    defining the focal surface as $\phi(y)=z$, then the modulation function $M(y,z)$ being expressed as $M(y,z)=\delta(z-\phi(y))$.

3. The method according to claim 2, wherein if the focal surface is parabola-shaped, the modulation function $M(y,z)$ is expressed as $\phi(y)=y_2^2$.

4. The method according to claim 2, wherein if the focal surface is step-shaped, the modulation function $M(y,z)$ is expressed as $\phi(y)=aH(y_2)$, where a is a constant coefficient and $H(\cdot)$ is a step function.

5. The method according to claim 1, wherein achieving the interleaved focal stack imaging is based on the modulation function $M(y,z)$ and the two-dimensional sensor image $I(y)$ comprises:
    with the interleaved focal stack imaging, demodulating the two-dimensional sensor image $I(y)$ to obtain a low resolution three-dimensional focal stack $F(y_z,z)=I(y_z) \cdot M(y_z,z)$, where $y_z \subset y$, $M(y_z,z)$ is the modulation function implementing interleave-shaped focal surface;
    defining $M(y_z,z)$ as $M(y,z)=\delta(z-h(y))$, where $h(y)=\Sigma_m g(y) \otimes \delta(y-m \cdot T)$, $m \in Z$ is a periodic function with a cycle T, a domain of $g(y)$ is $[0,T]$, $\otimes$ is a convolution operator; and
    assuming a discretized latent band-limited focal stack with n layers, then defining $g(y)=\Sigma_{i=1}^{n} a_i \cdot \text{rect}(y-i)$, where rect is a rectangle function, $z=1,\ldots,n$, $T=n$, $\{a_1,\ldots a_i \ldots j\ a_j \ldots, a_n\}=\{1,\ldots,n\}$, $a_i \neq a_j$, $n \in \Delta y$, and $\Delta y$ is a neighborhood of y representing a local sensor region containing all the n layers intended to be recovered.

6. The method according to claim 1, wherein achieving the compressive focal stack imaging based on the modulation functions $M(y,z)$ and the two-dimensional sensor image $I(y)$ comprises:
    using a random modulation function as a sensing matrix to obtain a single coded focal stack; and
    obtaining the recovered full-resolution three-dimensional focal stack by using an intrinsic sparsity thereof.

7. The method according to claim 1, wherein in the compressive focal stack imaging, obtaining a recovered full-resolution all-in-focus image and a depth map from the two-dimensional sensor image $I(y)$ by using a sparsity coding mechanism and a compressive sensing reconstruction algorithm in conjunction with a relative blur constraint and a transform domain spatial sparsity constraint comprises:
    compressing and reconstructing an initial three-dimensional focal stack;
    performing a depth from defocus estimation according to the initial three-dimensional focal stack to obtain the depth map;
    obtaining the relative blur constraint of the initial three-dimensional focal stack by the depth and feeding back the relative blur constraint of the initial three-dimensional focal stack into a recovered three-dimensional focal stack for compressing and reconstructing the recovered three-dimensional focal stack;

performing an iterative optimization between the depth from defocus estimation and the recovered three-dimensional focal stack reconstruction until convergence to obtain an optimized recovered three-dimensional focal stack and an optimized depth map; and generating the recovered full-resolution all-in-focus image and the depth map by using the optimized recovered three-dimensional focal stack and the optimized depth map.

8. An apparatus for coded focal stack photographing, comprising:

an image acquisition module, configured to change a focal surface within a single exposure time and per-pixel code a sensor readout for each focal surface to obtain a modulation function $M(y,z)$, where $y \in \{y_1, y_2\}$ is a two-dimensional spatial coordinate and z is a depth coordinate of a latent three-dimensional focal stack $F(y,z)$, and to code the latent three-dimensional focal stack $F(y,z)$ into a two-dimensional sensor image $I(y)$ by using the modulation function $M(y,z)$;

a programmable non-planar focal surface imaging module, configured to obtain an equivalent programmable non-planar sensor surface by the modulation functions $M(y,z)$ corresponding to a shape of the focal surface;

an interleaved focal stack imaging module, configured to multiplex the latent three-dimensional focal stack $F(y,z)$ into the two-dimensional sensor image $I(y)$, and to perform a demultiplexing and a bicubic interpolation for the latent three-dimensional focal stack $F(y,z)$ to obtain a recovered full-resolution three-dimensional focal stack; and a compressive focal stack imaging module, configured to obtain a recovered full-resolution all-in-focus image and a depth map from the two-dimensional sensor image $I(y)$ by using a sparsity coding and a compressive sensing reconstruction algorithm in conjunction with a relative blur constraint and a transform domain spatial sparsity constraint.

9. The apparatus according to claim 8, wherein the image acquisition module comprises:

a long-focus lens camera configured to photograph an object;

a programmable moving lens, disposed between the object and the long-focus lens camera and configured to change the focal surface;

an LCD panel, disposed between the programmable moving lens and the long-focus lens camera and configured to realize a per-pixel coding exposure;

a first relay lens, disposed between the programmable moving lens and the LCD panel and configured to relay a light path; and a second relay lens, disposed between the LCD panel and the long-focus lens camera and configured to relay the light path.

10. The apparatus according to claim 8, wherein the programmable non-planar focal surface imaging module is configured to define the focal surface as $\phi(y)=z$, then express the modulation function $M(y,z)$ as $M(y,z)=\delta(z-\phi(y))$.

11. The apparatus according to claim 10, wherein if the focal surface is parabola-shaped, the modulation function $M(y,z)$ is expressed as $\phi(y)=y_2^2$.

12. The apparatus according to claim 10, wherein if the focal surface is step-shaped, the modulation function $M(y,z)$ is expressed as $\phi(y)=aH(y_2)$, where a is a constant coefficient and $H(\cdot)$ is a step function.

13. The apparatus according to claim 8, wherein the interleaved focal stack imaging module is configured:

with the interleaved focal stack imaging, to demodulate the two-dimensional sensor image $I(y)$ to obtain a low resolution three-dimensional focal stack $F(y_z, z)=I(y_z)\cdot M(y_z, z)$, where $y_z \subset y$, $M(y_z,z)$ is the modulation function implementing interleave-shaped focal surface;

to define $M(y_z,z)$ as $M(y,z)=\delta(z-h(y))$, where $h(y)=\Sigma_m g(y)\otimes \delta(y-m\cdot T)$, $m \in Z$ is a periodic function with a cycle T, a domain of $g(y)$ is $[0,T]$, $\otimes$ is a convolution operator;

assuming a discretized latent band-limited focal stack with n layers, to define $g(y)=\Sigma_{i=1}^{n} a_i \cdot \text{rect}(y-i)$, where rect is a rectangle function, $z=1, \ldots, n$, $T=n$, $\{a_1, \ldots a_i \ldots a_j \ldots, a_n\}=\{1, \ldots, n\}$, $a_i \ne a_j$, $n \in \Delta y$, and $\Delta y$ is a neighborhood of y representing a local sensor region containing all the n layers intended to be recovered.

14. The apparatus according to claim 8, wherein the compressive focal stack imaging module is configured:

to use a random modulation function as a sensing matrix to obtain a single coded focal stack; and to obtain the recovered full-resolution three-dimensional focal stack by using an intrinsic sparsity thereof.

15. The apparatus according to claim 8, wherein the compressive focal stack imaging module comprises:

a compression unit, configured to compress and reconstruct an initial three-dimensional focal stack;

a depth from defocus estimation unit, configured to perform a depth from defocus estimation according to the initial three-dimensional focal stack to obtain the depth map;

a blur constraint unit, configured to obtain the relative blur constraint of the initial three-dimensional focal stack by the depth and to feed back the relative blur constraint of the initial three-dimensional focal stack into a recovered three-dimensional focal stack for compressing and reconstructing the recovered three-dimensional focal stack;

an iterative optimization unit, configured to perform an iterative optimization between the depth from defocus estimation and the recovered three-dimensional focal stack reconstruction until convergence to obtain an optimized recovered three-dimensional focal stack and an optimized depth map; and an all-in-focus image generating unit, configured to generate the recovered full-resolution all-in-focus image and the depth map by using the optimized recovered three-dimensional focal stack and the optimized depth map.

* * * * *